United States Patent [19]

Tsuyoshi et al.

[11] Patent Number: 4,796,246
[45] Date of Patent: Jan. 3, 1989

[54] METHOD AND APPARATUS FOR BEAM-TRACK ALIGNMENT IN OPTICAL DISK APPARATUS

[75] Inventors: Toshiaki Tsuyoshi; Takeshi Mada, both of Kokubunji, Japan

[73] Assignee: Hitachi, Ltd., Tokyo, Japan

[21] Appl. No.: 932,497

[22] Filed: Nov. 20, 1986

[30] Foreign Application Priority Data

Nov. 20, 1985 [JP] Japan ................... 60-258536

[51] Int. Cl.$^4$ ............................................. G11B 7/095
[52] U.S. Cl. ........................................ 369/44; 369/32
[58] Field of Search ............... 369/44, 43, 32, 30; 250/202

[56] References Cited

U.S. PATENT DOCUMENTS

| | | | |
|---|---|---|---|
| 4,435,797 | 3/1984 | Hsieh | 369/44 |
| 4,615,023 | 9/1986 | Inada | 369/44 |
| 4,630,250 | 12/1986 | Nonomura | 369/44 |

FOREIGN PATENT DOCUMENTS 107015  9/1976  Japan ................... 369/44

Primary Examiner—Alan Faber
Attorney, Agent, or Firm—Antonelli, Terry & Wands

[57] ABSTRACT

A method of beam-track alignment in an optical disk apparatus comprises detecting the velocity v of a beam spot moving in parallel to the surface of an optical disk and traversing a target track in a direction orthogonal with respect to the track, detecting the displacement x given by the distance between the center of the target track and the present position of the beam spot, and starting tracking control (position control) when the detected values of v and x satisfies a predetermined condition.

10 Claims, 15 Drawing Sheets

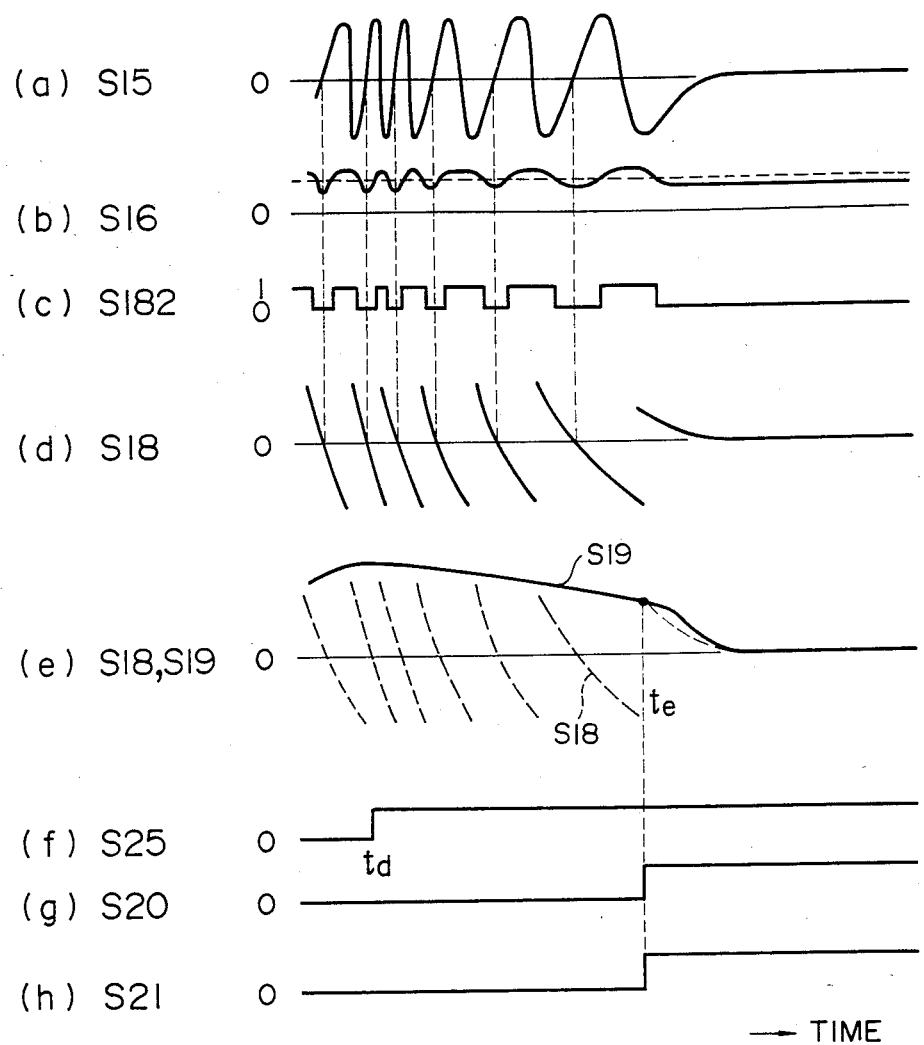

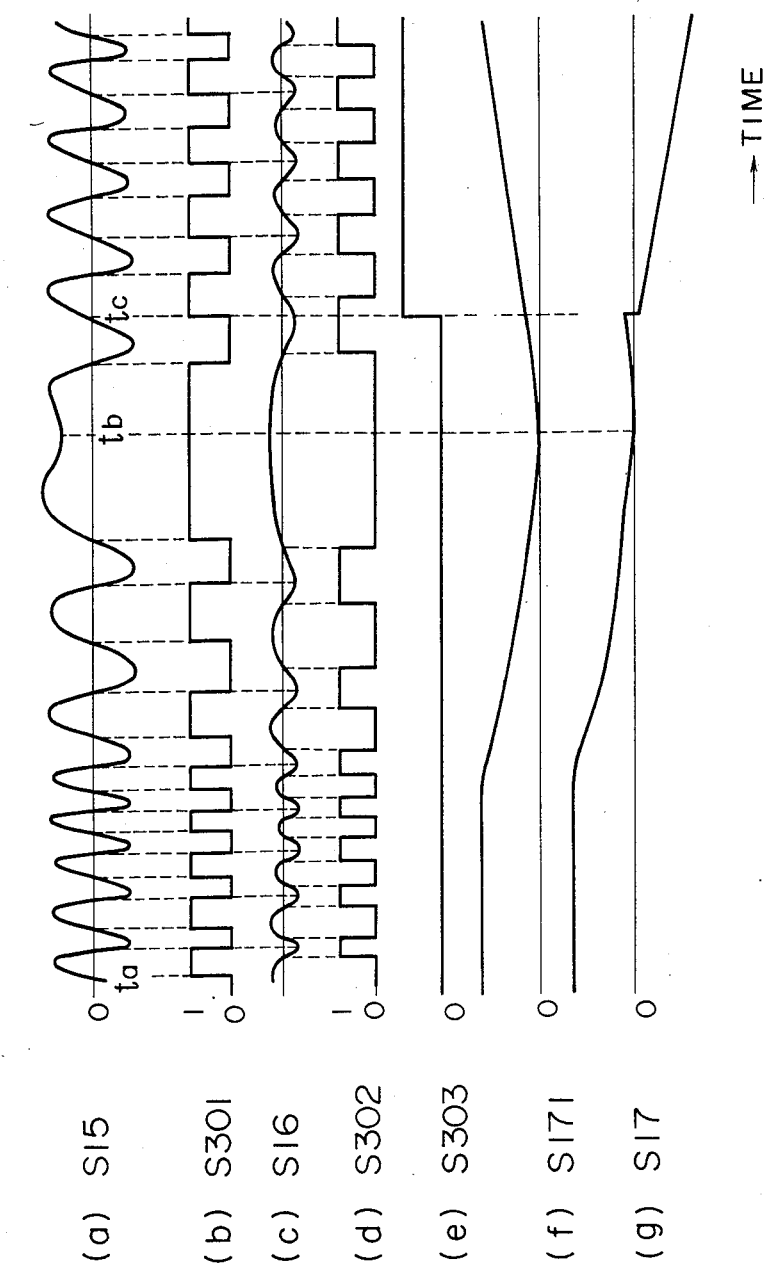

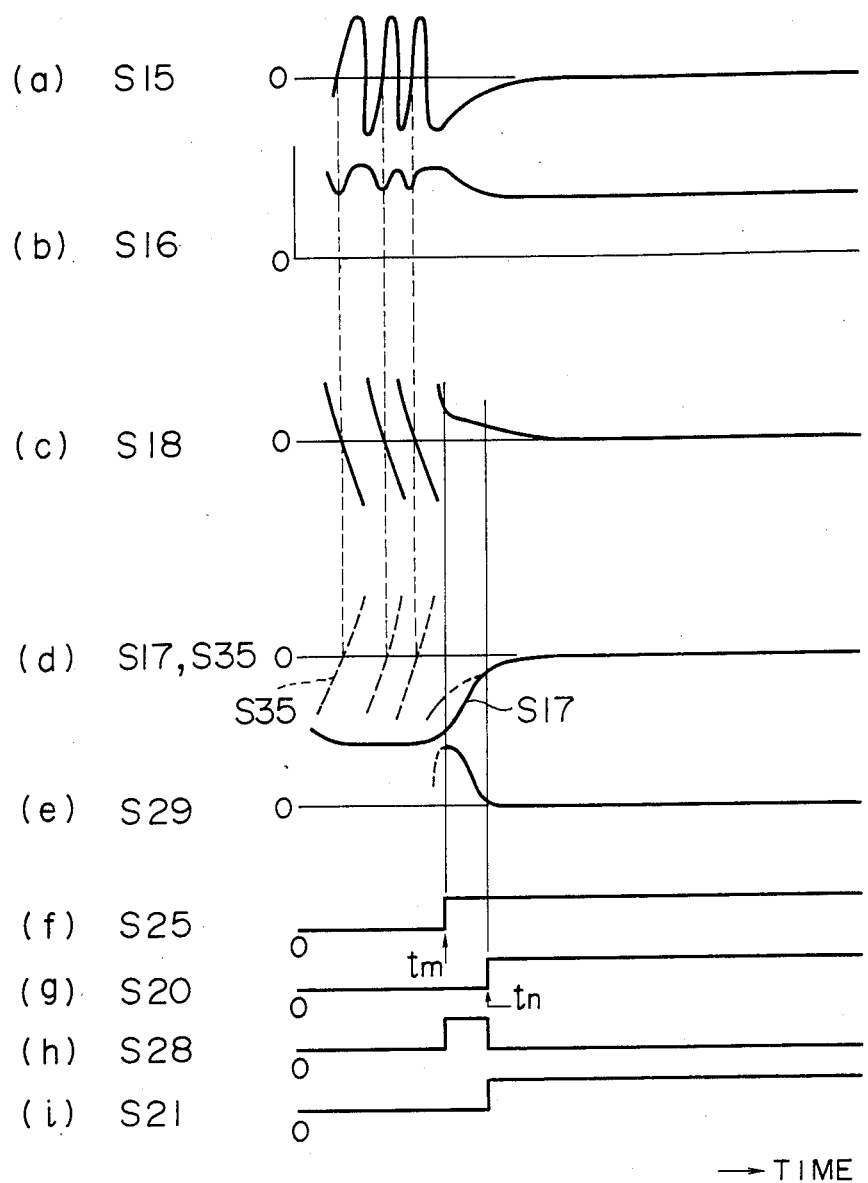

METHOD AND APPARATUS FOR BEAM-TRACK ALIGNMENT IN OPTICAL DISK APPARATUS

BACKGROUND OF THE INVENTION

This invention relates to an optical disk apparatus, and more particularly to a method and apparatus suitable for use in a tracking control system of the optical disk apparatus for aligning a beam spot with a desired track or leaading the beam spot in the desired track of an optical disk.

A prior art method of aligning a beam spot with a track of an optical disk loaded in an optical disk apparatus is disclosed in, for example, JP-A-51-107015. The method disclosed in JP-A-51-107015, comprises measuring and storing an eccentricity of a track, and forcedly deflecting the beam spot according to the stored data while reading out the stored data so that the beam spot can be shifted substantially in parallel to the track, thereby ensuring alignment of the beam spot with the track. However, the proposed method has been defective in that a relatively long period of time is required for storing the data of the eccentricity of the track. The proposed method has further been defective in that the beam-track aligning operation tends to become unstable when there occurs a beam-track misalignment resulting from a cause other than the eccentricity, for example, a track offset due to residual vibration of an optical head after a seek operation or due to an externally applied impact.

SUMMARY OF THE INVENTION

It is a primary object of the present invention to provide a method and apparatus for stably aligning a beam spot with a track of an optical disk within a short period of time even when there is a track offset attributable to a track eccentricity and other causes.

In order that the beam spot can be stably aligned with a desired or target track of an optical disk within a short period of time, it must be noted that the beam spot passing on the track has a limited transit velocity v in a transverse direction of the track, which velocity will be referred to hereinafter as a traversing velocity. An analysis by the inventors of the present application has clarified that the beam spot can be stably aligned with the target track by starting tracking servo control when there is the following relation ① or ② between the traversing velocity v described above and the displacement x (which represents the distance between the beam-spot servo starting point and the target track with which the beam spot is to be aligned):

① When the displacement x at the alignment starting point is $x = x_o$, the period of time required for alignment is minimum when the velocity v at the alignment starting point is given by $$v = -\frac{\omega_n}{\xi} \cdot x_o \qquad (1)$$

② When the velocity v at the alignment starting point is $v = v_o$, the period of time required for alignment is minimum when the displacement x at the alignment starting point is given by $$x = -\frac{1}{\omega_n \xi} \cdot v_o \qquad (2)$$

In the above equations (1) and (2), $\omega_n$ and $\xi$ represent a natural frequency and a damping factor respectively when the tracking servo loop (having the closed loop characteristics) is regarded as a second-order system.

According to the present invention which is based on the condition set forth by the equation (1) or (2), the traversing velocity v and displacement x of the beam spot are measured, and the tracking servo loop (a position control loop) is closed at the point which satisfies the equation (1) or (2), thereby shortening the period of time required for beam-track alignment by the tracking control.

BRIEF DESCRIPTION OF THE DRAWINGS

FIG. 3, consisting of (a)–(h), is a time chart showing signal waveforms appearing at various parts of the tracking system shown in FIG. 2.

FIG. 4(b) is a time chart showing signal waveforms appearing at various parts of the velocity detector shown in FIG. 4(a).

FIG. 13, consisting of (a)–(j), is a time chart showing signal waveforms appearing at various parts of the tracking system shown in FIG. 12.

DESCRIPTION OF THE PREFERRED EMBODIMENTS

Before describing preferred embodiments of the present invention in detail, the basic principle of the method of beam-track alignment according to the present invention will be described with reference to FIGS. 1(a) and 1(b).

The reason why the period of time required for beam-track alignment can be shortened by closing a tracking servo loop at a point satisfying the afore-mentioned equation (1) or (2), will be described.

Figure 1A:
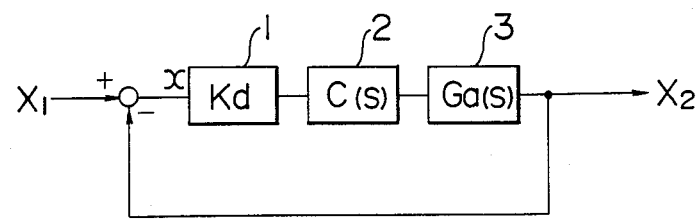
FIG. 1(a) is a block diagram of one form of a tracking control system commonly used in an optical disk apparatus.

FIG. 1(a) is a block diagram of one form of a tracking control system commonly used in an optical disk apparatus. In FIG. 1(a), an input $X_1$ to the system represents the radial distance from the position of the beam spot where the actuator is in an equilibrium state to the center of a desired or target track on the optical disk, and an output $X_2$ from the system represents the radial distance from the position of the beam spot where the actuator is in an equilibrium state to the center of the present beam spot driven by an actuator 3. The tracking control system operates to achieve the relation $X_1 = X_2$, that is, $X_2 - X_1 = x = 0$. x represents displacement of the beam spot relative to the track on which the beam-track alignment is desired. Such a closed loop has generally inertia, and its characteristics are analogous to those of a low-pass filter. Therefore, the tracking control system can be approximated by a second-order system model.

The transfer function W(s) of such a second-order, system, when subjected to the Laplace transformation, can be expressed as follows:

$$\frac{\overline{X_2}(s)}{\overline{X_1}(s)} \approx W(s) \frac{\omega_n^2}{S^2 + 2\xi\omega_n S + \omega_n^2} \tag{3}$$

Suppose that $x_o$ and $v_o$ are an initial displacement and an initial velocity respectively given at time t=0 in such a second-order system. Then, the displacement x(t) and velocity v(t) at time t are as follows:

$$x(t) \frac{e^{-\xi\omega_n t}}{p} \sqrt{(x_0 \cdot p)^2 + (x_0 \cdot \xi + v_0/\omega_n)^2} \cdot \sin(p \cdot \omega_n t + \phi_1) \tag{4}$$

$$v(t) = \tag{5}$$

$$\frac{e^{-\xi\omega_n t}}{p} \sqrt{(v_0 \cdot p)^2 + (\omega_n \cdot x_0 + \xi \cdot v_0)^2} \cdot \sin(\phi_2 - p \cdot \omega_n t)$$

where $$p = \sqrt{1 - \xi^2} \tag{6}$$

$$\phi_1 = \tan^{-1}\left(\frac{x_0 \cdot p}{x_0 \cdot \xi_+ + v_0/\omega_n}\right) \tag{7}$$

$$\phi_2 = \tan^{-1}\left(\frac{v_0 \cdot p/\omega_n}{x_0 + \xi \cdot v_0/\omega_n}\right) \tag{8}$$

$$0 < \xi < 1 \tag{9}$$

By way of example, the values of $\xi$ and $\omega_n$ in an optical disk tracking system are approximately as follows:

$$\xi = 0.4 \sim 0.5 \tag{10}$$

$$\omega_n = 1.0 \times 10^4 \sim 2.0 \times 10^4 \text{ (rad.)} \tag{11}$$

From the equations (4) and (5), it will be seen that the displacement x(t) and velocity v(t) at time t after the tracking servo operation has been started show the tendency of damped oscillation. Now, it is defined that the tracking servo completes the beam-track alignment when the following relations have been established:

$$|x(t)| \leq E_x \tag{12}$$

$$|v(t)| \leq E_v \tag{13}$$

where $E_x$ and $E_v$ are suitable positive values. When the oscillation factors are removed from the equations (4) and (5), the following equations are obtained:

$$x(t) = \frac{e^{-\xi\omega_n t}}{p} \sqrt{(x_0 \cdot p)^2 + (x_0 \cdot \xi + v_0/\omega_n)^2} \tag{14}$$

$$v(t) = \frac{e^{-\xi\omega_n t}}{p} \sqrt{(v_0 \cdot p)^2 + (\omega_n \cdot x_0 + \xi \cdot v_0)^2} \tag{15}$$

Then, the minimum period of time $t_0$ required for attaining the beam-track alignment is calculated by selecting the values of x(t) and v(t) which satisfy the relations (12) and (13) respectively. The attenuating portion $(e^{-\xi\omega_n t}/p)$ in each of the equations (14) and (15) is determined by the system constants of the tracking control system and is not dependent upon the initial displacement $x_0$ and initial velocity $v_0$. Shortening of the period of time required for attaining the beam-track alignment means that the values of x(t) and v(t) at the same time t are selected to be as small as possible. This means that the values of A and B given by the following equations $$(x_0 p)^2 + (x_0 \xi + v_0/\omega_n)^2 = A \tag{16}$$

$$(v_0 p)^2 + (\omega_n x_0 + \xi v_0)^2 = B \tag{17}$$

extracted from the equations (14) and (15) respectively are selected to be as small as possible. When now the term $v_0/\omega_n$ is expressed as $\hat{v}_0$, and the equations (16) and (17) are transferred using the equation (6), the following equations (18) and (19) are obtained:

$$A = x_0^2 + \hat{v}_0^2 + 2\xi x_0 \hat{v}_0 \tag{18}$$

$$C = x_0^2 + \hat{v}_0^2 + 2\xi x_0 \hat{v}_0 = B/\omega_n^2 \tag{19}$$

Thus, both the velocity and the displacement are expressed by the equations of the same form. When A and C in the equations (18) and (19) are constants, each of these equation is equivalent to an equation of an ellipse as shown in FIG. 1(b). Thus, for all the combinations of coordinates $(x_0, \hat{v}_0)$ of points on the illustrated ellipse, where $x_0$ and $\hat{v}_0$ represent the initial displacement and initial velocity respectively, the beam-track alignment can be attained within the same period of time $t_0$. Also, the larger the ellipse, that is, in other words, the larger the values of A and C, the period of time required for the beam-track alignment becomes longer. The value of $\hat{v}_0$ giving a maximum displacement $x_0$ and the value of the displacement $x_0$ giving a maximum velocity $\hat{v}_0$ in the ellipse are obtained by partial differentiation of the respective equations (18) and (19) for $x_0$ and $\hat{v}_0$, as follows:

$$\hat{v}_0 = -\frac{1}{\xi} x_0 \left( \frac{\partial A}{\partial x_0} = 0 \right) \quad (20)$$

$$x_0 = -\frac{1}{\xi} \hat{v}_0 \left( \frac{\partial C}{\partial \hat{v}_0} = 0 \right) \quad (21)$$

Figure 1B:
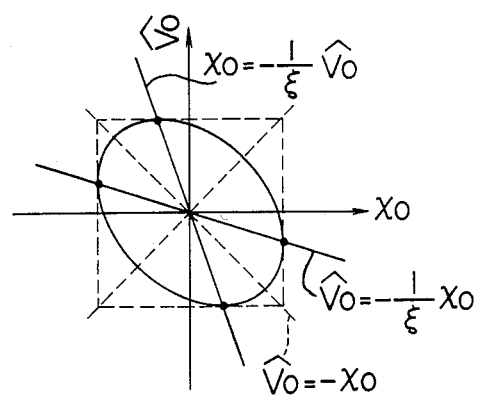
FIG. 1(b) illustrates the basic principle of the present invention according to which a relation between an initial displacement and an initial velocity for attaining beam-track alignment within a shortest possible period of time is shown.

The equations (20) and (21) provide the four coordinates of $x_0$ and $\hat{v}_0$ where four straight lines parallel to the $\hat{v}_0$—axis and $x_0$—axis are tangential to the ellipse in FIG. 1(b). The equations (20) and (21) have the following meanings:

The value of the initial velocity $v_0$ must satisfy the equation (20) when $x_0$ is the maximum value of the initial displacement permitting the beam-track alignment within the period of time $t_0$. In other words, when the value of the initial velocity $v_0$ satisfies the equation (20) at the initial displacement $x_0$, the beam-track alignment can be attained within a shortest period of time. Similarly, when the value of the initial displacement $x_0$ satisfies the equation (21) at the initial velocity $v_0$, the beam-track alignment can be attained within a shortest period of time.

Therefore, the relations ①, ② and the equations (1), (2) described hereinbefore can be derived from the equations (20) and (21) respectively. The equation (20) means that an initial displacement $x_1$ is preferentially previously determined, and an initial velocity $v_1$ optimum for $x_1$ is then selected from the equation (20). On the other hand, the equation (21) means that an initial velocity $v_2$ is preferentially previously determined, and an initial displacement $x_2$ optimum for $v_2$ is then selected from the equation (21). In the above cases, there is generally the relation $x_1 \neq x_2$ even if the relation $v_1 = v_2$ might hold casually.

The above description clarifies the theoretical basis of the present invention.

Preferred embodiments of the present invention will now be described in detail with reference to FIGS. 1 to 15. In the drawings, like reference numerals are used to designate like parts having the same or equivalent structure and function.

Figure 2:
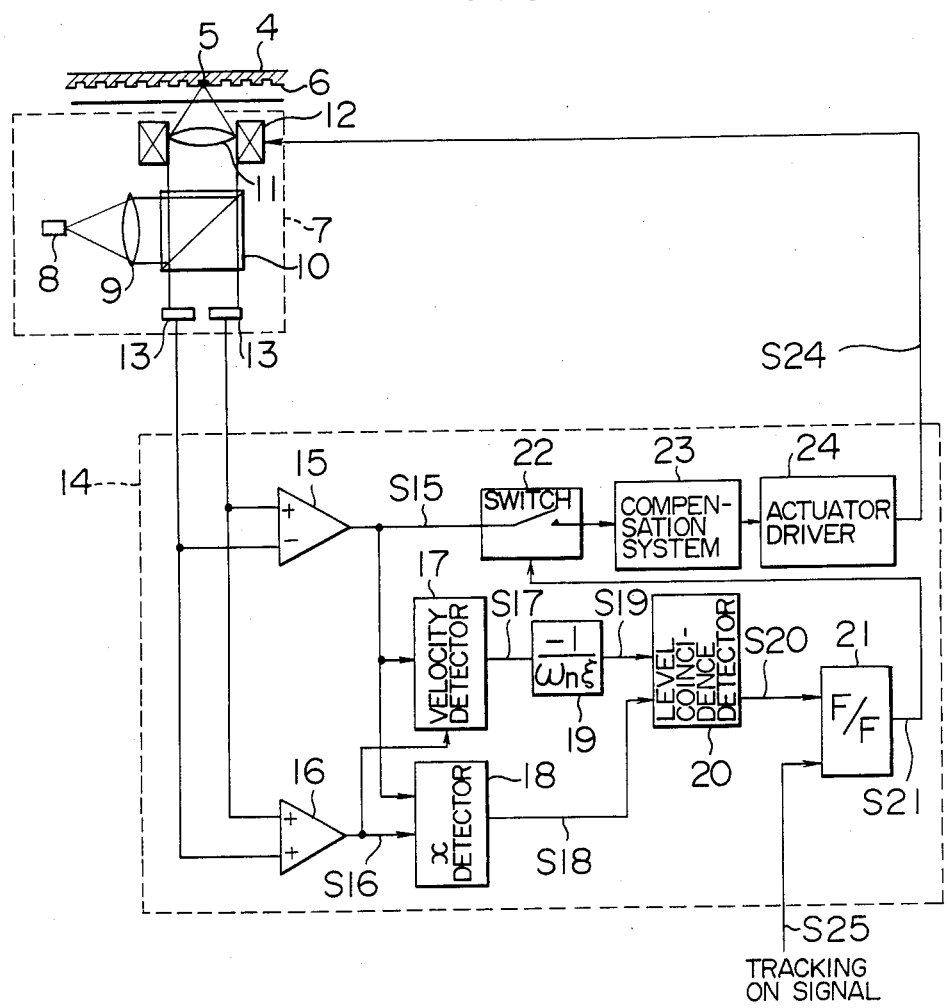
FIG. 2 shows the structure of a tracking system preferably used for the practice of a first embodiment of the method of the present invention.

FIG. 2 shows an overall structure of a tracking system preferably used for the practice of a first embodiment of the method of beam-track alignment according to the present invention. The first embodiment of the method is of the so-called velocity preferential type. According to this first embodiment, the traversing velocity v of a beam spot and the radial distance x to a desired or target track are measured when beam-track alignment is commanded, and a tracking servo loop of an optical disk apparatus is closed when the relation between v and x satisfies the equation (2).

First, the structure of the tracking system shown in FIG. 2 will be described. Referring to FIG. 2, the tracking system is composed of an optical disk 4, an optical pickup 7 and a tracking control circuit part 14. A laser beam emitted from a semiconductor laser 8 passes through a lens 9, a prism 10 and another lens 11 to be focused as a beam spot 5 on a reflection surface 6 of the disk 4. Tracks are provided on the reflection surface 6 of the disk 4. In the disk 4 shown in FIG. 2, the sectional shape in the radial direction of the disk 4 is exaggerated for the purpose of illustration. The beam reflected from the disk 4 passes the lens 11 and prism 10 again and arrives at a pair of photo detectors 13 to be subjected to photo-electric conversion. Although a push-pull method is used in FIG. 2 as a means for detecting a track error signal, any other track error detecting method such as a three spot method may be used as far as a tracking error signal can be accurately provided. Output signals from the two photo detectors 13 are applied to a differential amplifier 15 and a summing amplifier 16 in the tracking control circuit part 14. The differential amplifier 15 generates a track error signal S15 indicative of the difference between the two input signals, and the summing amplifier 16 generates a total light-quantity signal S16 indicative of the sum of the two input signals. Blocks 17 to 21 are essential parts of the first embodiment and will be described in detail later. The tracking servo loop includes the differential amplifier 15, an electronic switch 22 such as a transistor, a phase compensation system 23, a tracking actuator driver 24 and an actuator 12. The track error signal S15 generated from the differential amplifier 15 is applied through the electronic switch 22, which opens and closes the tracking servo loop, the phase compensation system 23 and the actuator driver 24 to the actuator 12, so that the beam spot can follow the track movement for tracking.

The operation of the first embodiment shown in FIG. 2 will be described with reference to a time chart of FIG. 3. Before the tracking servo operates, the beam spot traverses the track. Therefore, the track error signal S15 appearing from the differential amplifier 15 has a waveform as shown in (a) of FIG. 3. It will be seen that the signal S15 is analogous to a frequency-modulated sine wave signal. At portions of the signal S15 where the frequency of the sine wave is high, the velocity of the beam spot traversing the track is high. The total beam-quantity signal S16 generated from the summing amplifier 16 has a waveform as shown in (b) of FIG. 3. It will be seen that, at the center of the track, the beam quantity is minimum and the amplifier output is minimum, but, at the area intermediate between the track and an adjacent track, the beam quantity is maximum and the amplifier output is maximum.

In order to detect the velocity v of the beam spot traversing the track, the signal S15 is applied to a velocity detector 17 which generates a velocity signal S17. There are various methods for detecting the velocity v of the beam spot traversing the track. For example, there are ① a method which uses a frequency-voltage (F/V) converter; ② a method which uses the combination of a differentiation circuit and an envelope detection circuit or the combination of a differentiation circuit and a sample-hold circuit; and ③ a method which counts the period of time required for the beam spot to traverse the track. In any case where one of the methods described in ① to ③ is selected, the total beam-quantity signal S16 is used as a reference signal, and, on the basis of the phase relation between the signals S15 and S16, the direction of the beam spot traversing the track (that is, whether the beam spot moves from the inner toward the outer peripheral side of the disk or moves in the opposite direction) is detected to determine the polarity of the velocity signal S17.

Figure 4A:
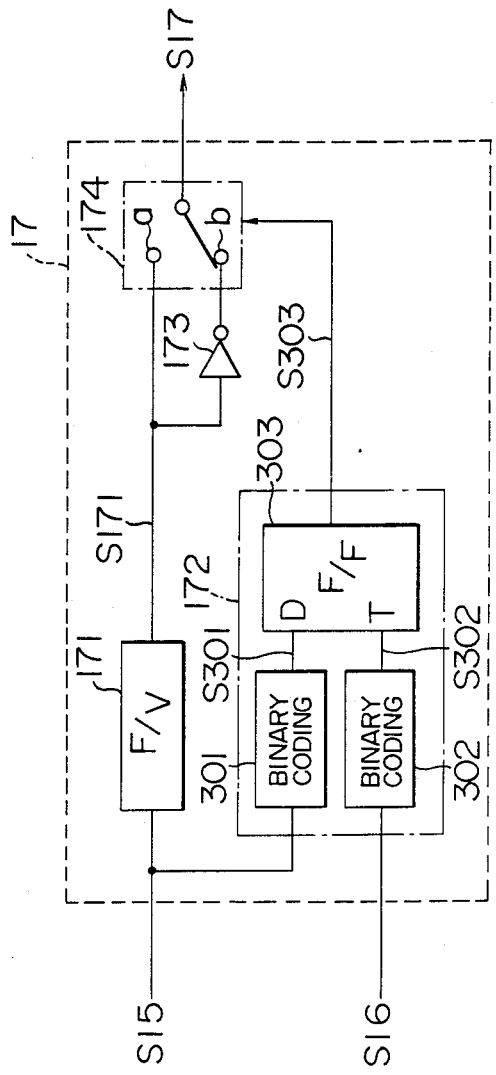
FIG. 4(a) shows the structure of one form of the velocity detector in the tracking system shown in FIG. 2.

One form of the velocity detector 17 which is based on the method described in ① has a structure as shown in FIG. 4(a). Referring to FIG. 4(a), the track error signal S15 is applied to an F/V converter 171 which generates an output signal S171 having a value proportional to the velocity of the beam spot. This signal S171 is applied to a terminal a of a switch 174 and applied also to a terminal b of the switch 174 through an inverter 173. The switch 174 is, for example, an electronic switch such as a transistor, and its movable strip is connected to one of the terminals a and b under control of a signal S303. On the other hand, the signals S15 and S16 are applied to respective binary coding circuits 301 and 302 in a polarity decision circuit 172. The binary coding circuit 301 generates an output signal S301 which turns into its high level when the value of the signal S15 is larger than 0. The other binary coding circuit 302 generates an output signal S302 which turns into its high level when the value of the signal S16 is larger than a predetermined positive value. The signals S301 and 302 are applied as a D input and a T input respectively of a D-type flip-flop 303.

In a signal waveform diagram shown in FIG. 4(b), the direction of the beam spot traversing the track is reversed at time $t_b$. Therefore, between time $t_a$ and time $t_b$, the level of the signal S301 changes from "1" to "0" while the signal S302 is in its high level. On the other hand, after the time $t_b$, the level of the signal S301 changes from "0" to "1" while the signal S302 is in its high level. Therefore, the output signal S303 of the flip-flop 303 changes from its low level to its high level at time $t_c$ as shown in (e) of FIG. 4(b), thereby changing over the position of the movable strip of the switch 174. When, for example, the movable strip of the switch 174 is changed over from the position in contact with the terminal a to the position in contact with the terminal b. When the signal S303 turns into its high level, the polarity of the velocity signal S17 which is the output signal of the switch 174 is changed over at time $t_c$ as shown in (g) of FIG. 4(b). Thus, the polarity and absolute value of the velocity signal S17 indicate the direction and velocity respectively of the beam spot traversing the track.

In the meantime, in response to the application of the signals S15 and S16, a distance detector 18 (referred to hereinafter as an x detector) detects the distance x between the track center and the beam spot. Although the signal S15 itself is a sort of a distance signal, it is a sine wave signal which makes one cycle whenever the beam spot traverses a track. Therefore, the value of the signal S15 shows a linearity with respect to the distance x within a narrow range less than and including $\pm q/4$, where q is the track pitch, and the value of the signal S15 does not represent an accurate distance x in ranges outside the narrow range of $\pm q/4$. Now, x represents a distance between the beam spot and the center of the track adjacent to the beam spot in the direction to which the spot moves and so x takes a value between $$-\frac{q}{2} \text{ and } \frac{q}{2}.$$

Accordingly, the voltage value of the track error signal S15 is compensated on the basis of the phase of the total beam-quantity signal S16 to obtain a discontinuous signal S18 having a waveform as shown in (d) of FIG. 3.

Figure 5:
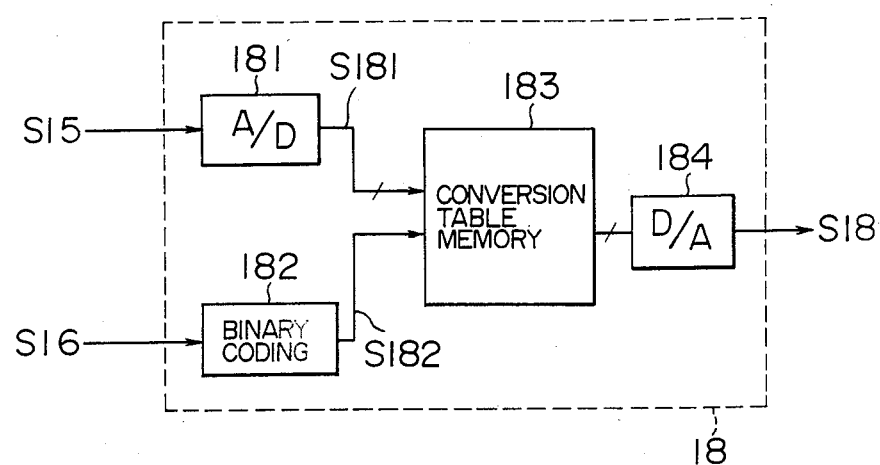
FIG. 5 shows the structure of one form of the x detector in the tracking system shown in FIG. 2.

One form of the practical structure of the x detector 18 is shown in FIG. 5. Referring to FIG. 5, the total beam-quantity signal S16 is applied to a binary coding circuit 182. This binary coding circuit 182 generates an output signal S182 having a waveform as shown in (c) of FIG. 3. It will be seen that this signal S182 has a high level when the level of the signal S16 is larger than a predetermined positive value. This signal S182 indicates whether the beam spot is located adjacent to the center of the track or located in an area between the track and adjacent tracks. On the other hand, the signal S15 is applied to an A/D converter 181 to be converted into a digital S181. The two signals S181 and S182 are applied to a conversion table memory 183. This memory 183 stores, for example, a three-dimensional map of values of x previously corrected relative to various values of each of the signals S181 and S182. Therefore, values of x are read out by retrieving the memory 183 on the basis of the values of the signals S181 and S182. The memory 183 may, for example, be a ROM. Then, the output signal of the memory 183 is D/A converted by a D/A converter 184 to provide the x signal S18 which is an analog signal.

The beam track alignment point is detected on the basis of the equation (2) in a manner as described below.

First, the output signal S17 of the velocity detector 17 is multiplied by the factor of $-1/\omega_n\xi$ by an amplifier (or an attenuator) 19, and the resultant output signal S19 representing $-v/\omega_n\xi$ (where v is the value of the signal S17) is applied to a level coincidence detector 20. The level coincidence detector 20 is, for example, a window comparator and compares the level of the signal S19 with that of the signal S18. The level coincidence detector 20 generates an output signal S20 of high level when the level of the signal S19 coincides with that of the signal S18. That is, when the level of the signal S19 coincides with that of the signal S18 at time $t_e$ as shown in (e) of FIG. 3, the output signal S20 of the level coincidence detector 20 turns into its high level. This signal S20 is applied to a flip-flop 21 together with a tracking ON signal S25 externally applied to the optical disk apparatus from a higher-order system such as a host computer (not shown). The tracking ON signal S25 has been turned into its high level commanding the tracking control at time $t_d$ as seen in (f) of FIG. 3. Therefore, as soon as the signal S20 turns into its high level at time $t_e$, the flip-flop 21 is set. When the flip-flop 21 is set, its output signal or a tracking timing signal S21 turns into its high level commanding the tracking control, and the switch 22 is closed to start the tracking control operation. Therefore, the beam spot is immediately aligned with the adjacent track. At the time $t_e$ at which the tracking control operation is started, the value of the distance x between the beam spot and the center of the adjacent track in the traversing direction of the beam spot is equal to the value $$-\frac{v}{\omega_n\xi}$$

of the signal S19. Thus, the equation (2) is now satisfied, and the beam spot is aligned with the target track within a shortest period of time.

In the first embodiment of the present invention, the analog signals are based to detect the level coincidence in the level coincidence detection circuit 20. However, the level coincidence between the result of velocity detection and that of x detection may be detected by a digital circuit which makes digital processing.

In the optical disk apparatus, the velocity v of the beam spot changes generally gradually as compared to changes in the displacement x when the tracking is not made. Therefore, in the first embodiment of the method which is of the so-called velocity preferential type, the tracking operation is started as soon as the displacement x satisfying the equation (2) is detected.

Figure 6:
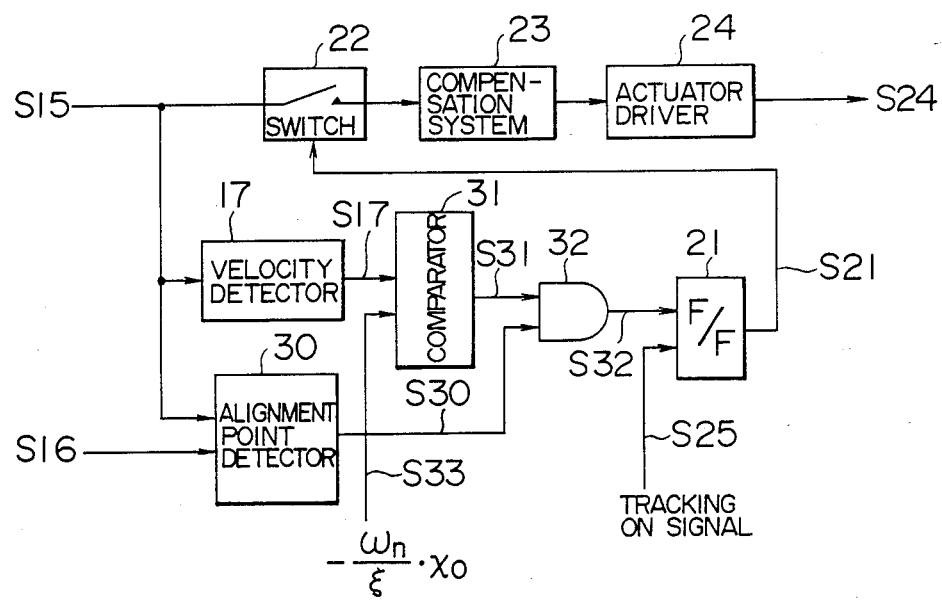
FIG. 6 shows the structure of part of a tracking system preferably used for the practice of a second embodiment of the method of the present invention.

A second embodiment of the method of the present invention will be described with reference to FIGS. 6 to 9(a), 9(b). This second embodiment is also of the velocity preferential type. FIG. 6 shows a modification of the tracking control circuit part of the first embodiment shown in FIG. 2, and the same reference numerals are used to designate the same or equivalent parts appearing in FIG. 2. Therefore, the same peripheral elements including the optical pickup are provided although not shown. The same applies also to other embodiments. In this second embodiment, a displacement $x_0$ (the distance between a target track and the beam spot) at which tracking control is to be started is previously determined, and the velocity $v_0$ of the beam spot when the displacement x is equal to $x_0$ is calculated from the equation (1), so that the tracking servo loop can be closed when the actual velocity v of the beam spot at the displacement $x=x_0$ becomes substantially equal to the calculated value $v_0$.

FIG. 6 is a block diagram showing the structure of a tracking control system preferably used for the practice of the second embodiment of the method of the present invention. It this second embodiment, the value of the output signal S17 of the velocity detector 17 is compared in a comparator 31 with a predetermined value $$-\frac{\omega_n}{\xi} x_0$$

(where $x_0$ is a predetermined value) determined by the equation (1), and the resultant output signal S31 of the comparator 31 is applied as one input to an AND gate 32. A beam-track alignment detector 30 detects as to whether or not the displacement x has attained a predetermined value on the basis of the signals S15 and S16 applied thereto and applies its output signal S30 as the other input to the AND gate 32. The output signal S32 of the AND gate 32 is applied to the flip-flop 21 together with the tracking ON signal S25, and the resultant output signal S21 of the flip-flop 21 controls the switch 22.

Figure 7:
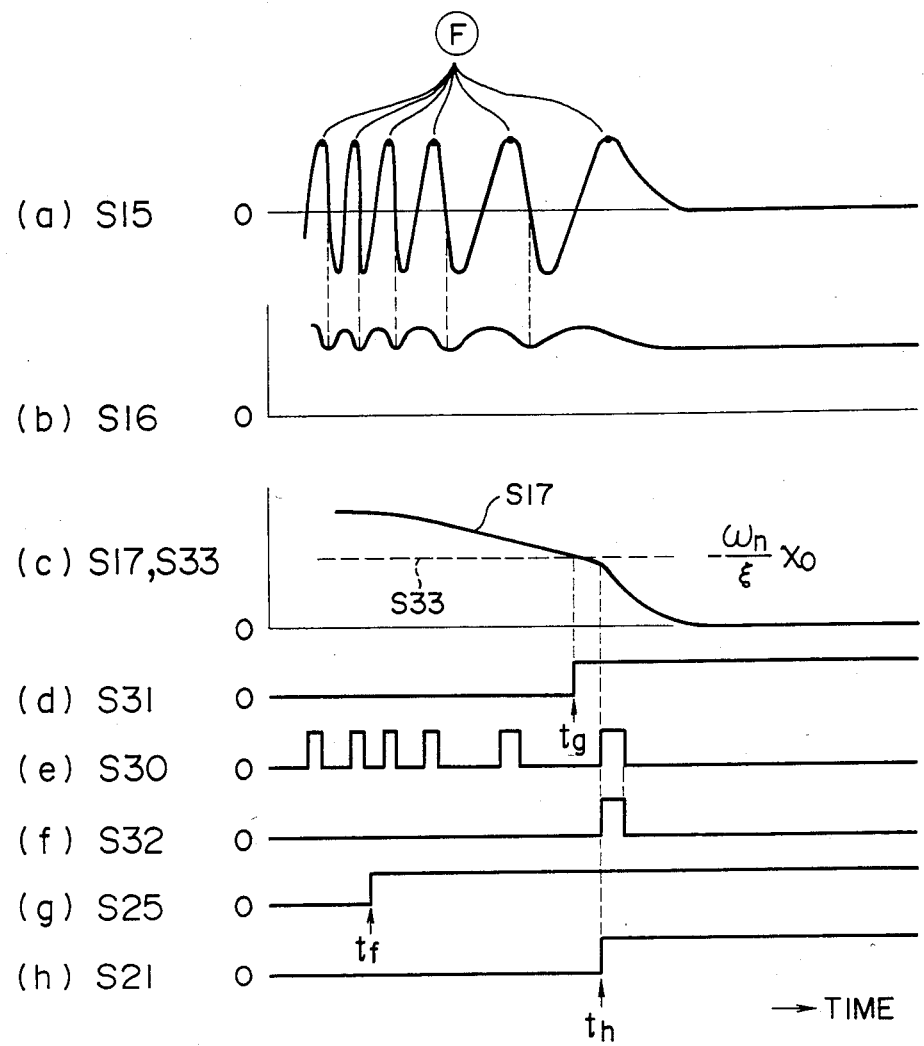
FIG. 7, consisting of (a)–(h), is a time chart showing signal waveforms appearing at various parts of the tracking system shown in FIG. 6.

The operation of this second embodiment will be described with reference to a time chart of FIG. 7. The track error signal S15 shown in FIG. 7 is that generated in the absence of the tracking control. The track error signal S15 has a sinusoidal waveform as the beam spot is traversing a track. It will be seen that the cycle of the signal S15 becomes gradually long, that is, the beam spot traverses the track in a direction in which its velocity becomes lower. The total beam-quantity signal S16 is changing with the changes in the value of the signal S15 in such a relation that its value becomes minimum at the center of the track, as in the case of the first embodiment. When the tracking ON signal S25 is turned into its high level at time $t_f$ under such a situation, the second embodiment operates in a manner as described below. The track error signal S15 is applied to the velocity detector 17 which detects the traversing velocity v of the beam spot. The method of velocity detection may be any one of the methods described in ① to ③ with reference to the first embodiment. Herein, the velocity detector 17 has the same structure as that shown in FIG. 4(a). In this second embodiment, detection of the absolute value of the velocity v only is required, and the signal S16 is not necessarily required for the velocity detection. Therefore, the F/V converter 171 shown in FIG. 4(a) is only incorporated in the velocity detector 17 used in the second embodiment.

On the other hand, in this embodiment, the point at which the track error signal S15 attains its peak and the beam spot moves into the center of the track while traversing the track, is selected as a starting point of tracking servo operation. That is, in this embodiment, the starting point of tracking servo operation is generally given by $$x_0 = \pm \frac{q}{4} \tag{22}$$

where q is the track pitch, and each of points Ⓕ shown in (a) of FIG. 7 corresponds to the servo operation starting point. Therefore, when the velocity v at one of these points Ⓕ satisfies the equation (1), that is, when the equation $$v = \pm \frac{\omega_n}{\xi} \cdot \frac{q}{4}$$

holds at that point Ⓕ, the tracking servo loop is closed at that point Ⓕ.

The output signal S17 of the velocity detector 17 is compared in the comparator 31 with a signal S33 indicative of the predetermined constant $$-\frac{\omega_n}{\xi} \cdot x_0 \left( \text{where } x_0 = \pm \frac{q}{4} \right),$$

and, when the value of the signal S17 coincides with that of the signal S33 at a time point $t_g$ in (c) of FIG. 7, the output signal S31 of the comparator 31 turns into its high level. Therefore, during the period of time in which the signal S31 remains in its high level, the tracking control for beam-track alignments can be started at any one of the points Ⓕ.

The value of the signal S33 is $$\frac{\omega_n}{\xi} \cdot \frac{q}{4}$$

when the velocity detector 17 is constituted by the F/V converter 171 alone.

Figure 8A:
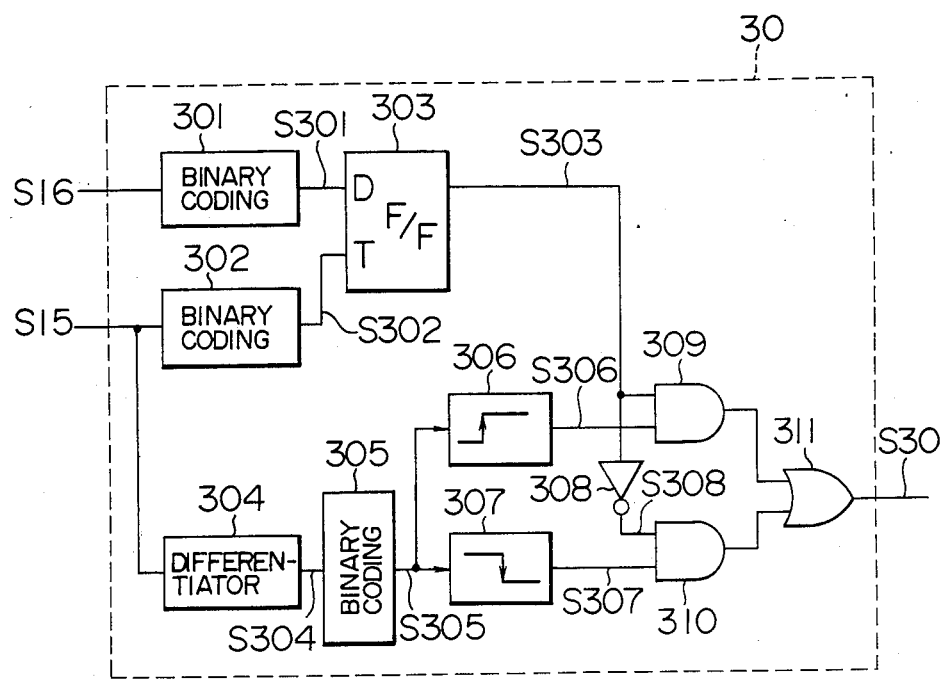
FIG. 8(a) shows the structure of one form of the aligning start point detection circuit in the tracking system shown in FIG. 6.
Figure 8B:
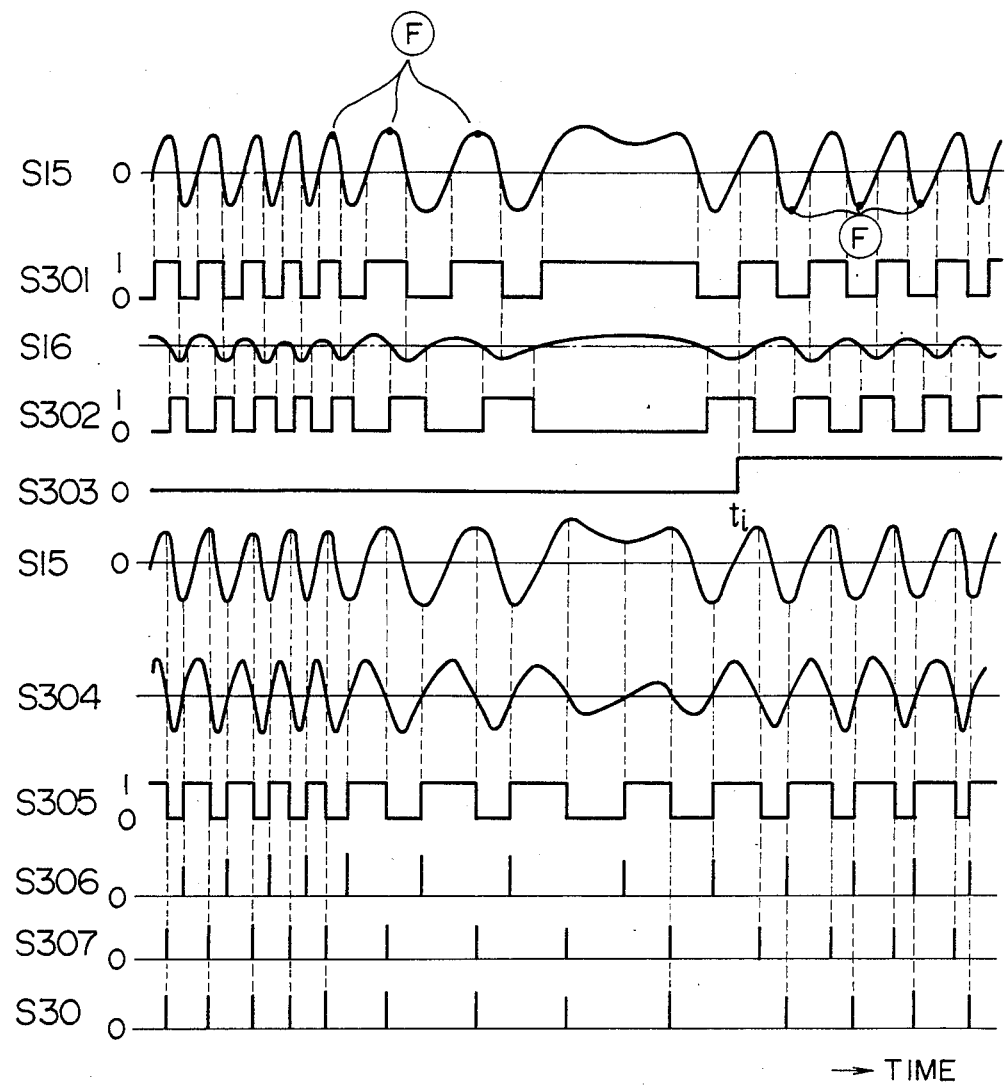
FIG. 8(b) is a time chart showng signal waveforms appearing at various parts of the aligning start point detection circuit shown in FIG. 8(a).

On the other hand, the beam-track alignment points, that is, the points Ⓕ are detected by the beam-track alignment point detector 30. This detector 30 may have any one of various structures. FIG. 8(a) shows the structure of one form of the beam-track alignment point detector 30, and FIG. 8(b) is a time chart of signal voltages appearing at various parts of FIG. 8(a). The circuit 30 shown in FIG. 8(a) detects points where the displacement x is equal to $$\frac{q}{4}$$

and generates a pulse signal S30 indicative of such points.

In FIG. 8(a), the combination of the binary coding circuits 301, 302 and the D-type flip-flop 303 constituting the polarity decision circuit 172 in FIG. 4(a) are also incorporated, and the level of the output signal S303 of the D-type flip-flop 303 indicates the track traversing direction of the beam spot.

Depending on the track traversing direction of the beam spot, the positive peak points or negative peak points of the track error signal S15 provide the beam-track alignment points Ⓕ, that is, the points where $x=q/4$. Therefore, it is necessary to select the positive or negative peak points of the track error signal S15 according to the level of the output signal S303 of the D-type flip-flop 303. The peak points of the signal S15 are detected in a manner as described below.

First, the track error signal S15 is differentiated by a differentiation circuit 304 to obtain an output signal S304 from the circuit 304, and this signal S304 having a waveform as shown in FIG. 8(b) is applied to a binary coding circuit 305. The binary coding circuit 305 generates an output signal S305 which turns into its "1" level and "0" level when the value of the signal S304 is positive and negative respectively, as shown in FIG. 8(b). The binary-coded signal S305 is applied to one-shot multivibrators 306 and 307. The one-shot multivibrators 306 and 307 generate pulse signals S306 and S307 corresponding to the leading and trailing edges respectively of the waveform of the signal S305, as shown in FIG. 8(b). The signal S306 is applied to an AND gate 309 together with the signal S303, and the signal S307 is applied to another AND gate 310 together with a signal S308 obtained by inverting the signal S303 by an inverter 308. The output signals of the AND gates 309 and 310 are passed through an OR gate 311 to appear as the signal S30.

As will be apparent from FIG. 8(b), the signal S30 is synchronous with the positive peak points of the signal S15 during the period in which the signal S303 is in its low level, and the signal S30 is then synchronized with the negative peak points of the signal S15 after the signal S303 turns into its high level at time $t_i$. Thus, the signal S30 is generated when the displacement x of the beam spot from the target track is equal to $$\pm \frac{q}{4}.$$

As shown in FIG. 6, the signal S30 is applied to the AND gate 32 together with the signal S31 from the comparator 31. Therefore, the AND gate 32 applies an output pulse S32 to the flip-flop 21 at time $t_h$ in response to a pulse of the pulse signal S30 appearing after the signal S31 has turned into its high level. The tracking ON signal S25 has turned into its high level already at time $t_f$. Therefore, in response to the pulse signal S32, the output signal S21 of the flip-flop 21 turns into its high level to close the switch 22, and the tracking control for beam-track alignment is started.

It will be seen from the above description of the second embodiment that the beam-track aligning operation is started when the value of the velocity v of the beam spot satisfies the equation (1), that is, when v is equal to $$v = \pm \frac{\omega_n}{\xi} \cdot \frac{q}{4},$$

and, also, when the displacement x is equal to $$x = \pm \frac{q}{4}.$$

In this second embodiment, the x detector 18 (FIG. 5) incorporated in the first embodiment is unnecessary since the displacement detected for starting the beam-track alignment (the initial displacement $x_0$) is fixed. Therefore, the structure is correspondingly simplified. Further, when the x detector 18, which detects the value of the displacement x on the basis of the voltage value of the signal S15, is provided, the value of the displacement x may not be accurately detected if the value of the signal S15 changes due to a change in the reflectivity of the reflecting surface of the optical disk. In such a case, the starting point of beam-track alignment may deviate slightly from the value of the equation (2). In contrast, in this second embodiment, the peak point of the signal S15 is detected to determine the point of starting the beam-track alignment. Therefore, the beam-track aligning operation can be accurately started regardless of any change in the amplitude of the signal S15.

In the second embodiment described above, the beam-track alignment is started when the displacement x becomes equal to $$x = \pm \frac{q}{4}.$$

However, the beam-track alignment may be started at time where the velocity of the beam spot is higher than that described already, that is, at time earlier than the time $t_g$ shown in FIG. 7. Thus, the beam-track alignment may be started at any one of points where x is, for example $$x = \pm \frac{q}{2}.$$

Figure 9A:
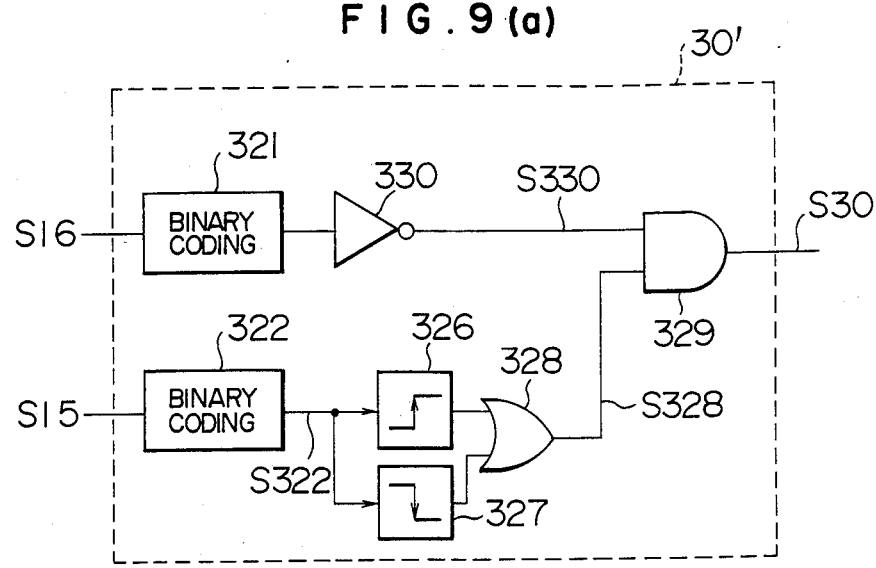
FIG. 9(a) shows the structure of another form of the aligning start point detection circuit.
Figure 9B:
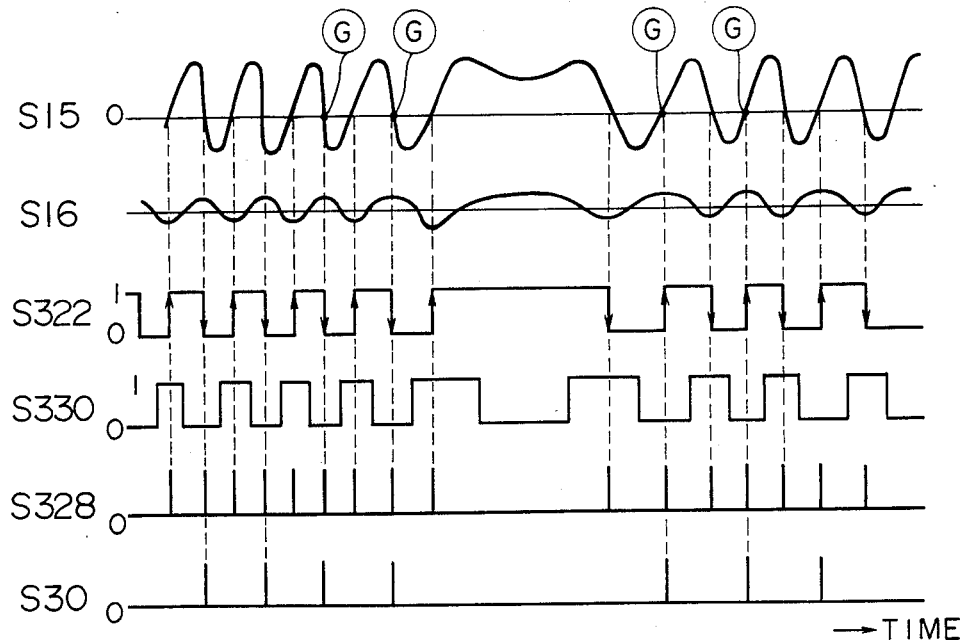
FIG. 9(b) is a time chart showing signal waveforms appearing at various parts of the aligning start point detection circuit shown in FIG. 9(a).

In such a case, the beam-track alignment detector 30 shown in FIG. 6 may be replaced by a circuit 30' as shown in FIG. 9(a). FIG. 9(b) is a time chart showing signal waveforms appearing at various parts of the circuit 30' shown in FIG. 9(a). The relation $$x = \pm \frac{q}{2}$$

holds at each of points Ⓖ on the waveform of the track error signal S15 shown in FIG. 9(b).

The points Ⓖ are detected in the circuit 30' in a manner as described below. The total beam-quantity signal S16 is converted by a binary coding circuit 321 into a pulse signal where its "1" and "0" levels correspond to the positive and negative values respectively of the signal S16. This pulse signal is passed through an inverter 330 to appear as a signal S330 having a waveform as shown in FIG. 9(b), and this signal S330 is applied as one input to an AND gate 329. On the other hand, the track error signal S15 is converted by another binary coding circuit 322 into a pulse signal S322 where its "1" and "0" levels correspond to the positive and negative values respectively of the signal S15 as shown in FIG. 9(b). This pulse signal S322 is applied to one-shot multivibrators 326 and 327. The one-shot multivibrators 326 and 327 generate pulse signals corresponding to the leading and trailing edges respectively of the waveform of the signal S322. These pulse signals are passed through an OR gate 328 to appear as a signal S328 having a waveform as shown in FIG. 9(b), and the signal S328 is applied as the other input to the AND gate 329. Therefore, the AND gate 329 generates a pulse signal S30 in which the individual pulses correspond respectively to the points Ⓖ on the waveform of the signal S15, that is, the points where $$x = \pm \frac{q}{2}.$$

When the beam-track alignment detection circuit 30' is incorporated in the circuit of FIG. 6 to replace the detector 30, the switch 22 is closed at time where the value of the velocity v of the beam spot satisfies the equation (1), that is, when the velocity v is equal to $$v = \pm \frac{\omega_n}{\xi} \cdot \frac{q}{2}$$

and where the displacement x becomes equal to $$x = \pm \frac{q}{2}.$$

Thus, the beam-track alignment is started at one of the points where $$x = \pm \frac{q}{2},$$

that is, at the point where the initial velocity $v_0$ is high. Therefore, as compared to starting the beam-track alignment at one of the points where $$x = \pm \frac{q}{4},$$

the period of time required for waiting the drop of the velocity v can be shortened.

In the second embodiment described above, the beam-track alignment is started at one of the points where $$x = \pm \frac{q}{4} \text{ or } x = \pm \frac{q}{2}.$$

However, the beam-track alignment may be started at any point where x is $$-\frac{q}{2} \leq x \leq \frac{q}{2}.$$

Figure 10:
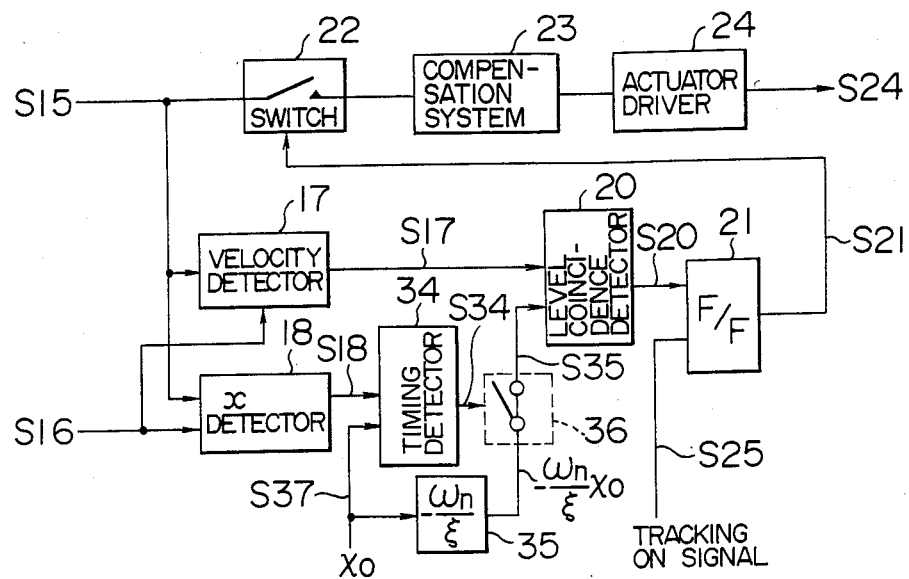
FIG. 10 shows the structure of part of a tracking system preferably used for the practice of a third embodiment of the method of the present invention.
Figure 11:
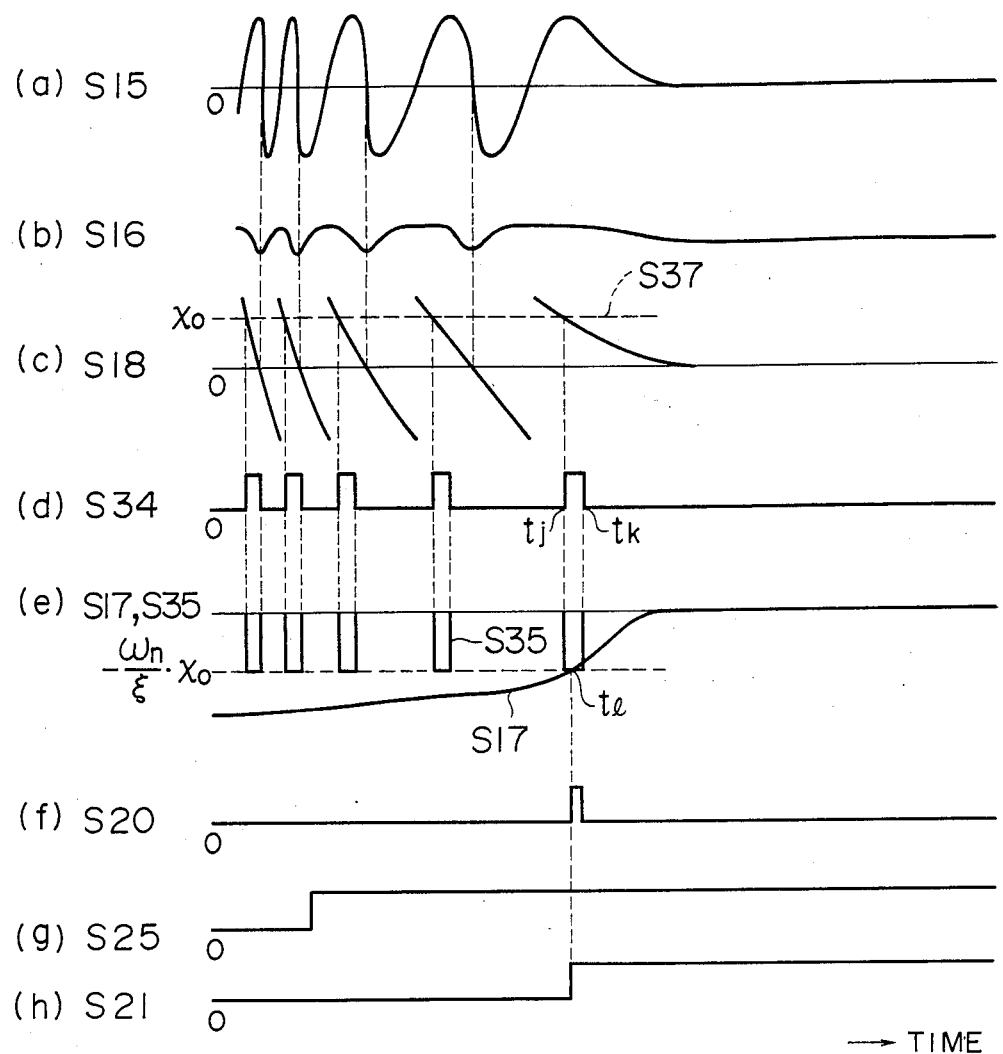
FIG. 11, consisting of (a)–(h), is a time chart showing signal waveforms appearing at various parts of the tracking system shown in FIG. 10.

Such a modification will be described as a third embodiment with reference to FIGS. 10 and 11. FIG. 10 is a block diagram showing the structure of the tracking system preferably used for the practice of the third embodiment of the method, and FIG. 11 is a time chart showing signal waveforms appearing at various parts of the system shown in FIG. 10.

In this third embodiment, the starting point of beam-track alignment is set at any value between $$x_0 = -\frac{q}{2} \text{ and } x_0 = +\frac{q}{2},$$

and, each time the distance x between the beam spot and the center of a target track being traversed by the beam spot attains the relation $x = x_0$, whether or not the velocity v of the beam spot at that time is substantially equal to the value $$\frac{\omega_n}{\xi} x_0$$

in the equation (1), is checked. When the result of checking proves that the velocity v of the beam spot is substantially equal to $$\frac{\omega_n}{\xi} x_0,$$

the tracking servo loop is closed.

The operation of this third embodiment will now be described.

First, the x detector 18 detects the incessantly changing displacement x of the beam spot, and the voltage signal S18 indicative of the detected displacement x is applied to a timing detector 34 which is, for example, a comparator. In the timing detector 34, the value of the signal S18 is compared with the predetermined value $x_0$ provided by a reference signal S37. When the value of the signal S18 becomes equal to the predetermined value $x_0$, a pulse signal S34 including pulses each having a predetermined pulse width as shown in (d) of FIG. 11 is applied from the timing detector 34 to a switch 36 to close the switch 36. The switch 36 may be an electronic switch such as a transistor. In the meantime, the signal S37 indicative of $x_0$ is multiplied by the factor of $$-\frac{\omega_n}{\xi}$$

by an amplifier (or an attenuator) 35, and the output signal S35 of the amplifier (or attenuator) 35 is applied through the switch 36 to the level coincidence detection circuit 20. The velocity signal S17 from the velocity detector 17 is also applied to the coincidence detection circuit 20. The level coincidence detection circuit 20 is, for example, a window comparator and generates a pulse S20 having a predetermined pulse width when the level of the signal S35 coincides substantially with that of the signal S17. Therefore, when, for example, the level of the signal S18 coincides with that of the signal S37 at time $t_j$ as shown in (c) of FIG. 11, a pulse S34 lasting from time $t_j$ to time $t_k$ as shown in (d) of FIG. 11 is generated from the timing detector 34 to close the switch 36. Accordingly, the signal S35 is applied to the level coincidence detection circuit 20 to be compared with the signal S17. When the value of the signal S17 coincides with the value $$\left(-\frac{\omega_n}{\xi} x_0\right)$$

of the signal S35 at time $t_l$ between time $t_j$ and $t_k$ as shown in (e) of FIG. 11, the pulse signal S20 shown in (f) of FIG. 11 is generated from the level coincidence detection circuit 20 at that time $t_l$ and applied to the flip-flop 21. Therefore, when the tracking ON signal S25 is in its high level already at that time $t_l$, the flip-flop 21 is set in response to the pulse signal S20 thereby closing the switch 22.

Generally, the velocity v of the beam spot changes very gradually as compared to the change in the displacement x. Thus, by checking whether or not the value of the velocity v satisfies the predetermined setting in the equation (1) each time the detected displacement x coincides with the predetermined setting $x_0$, the beam-track alignment point can be automatically detected.

The third embodiment described above is thus a more generalized form of the tracking system of the displacement preferential type.

Figure 12:
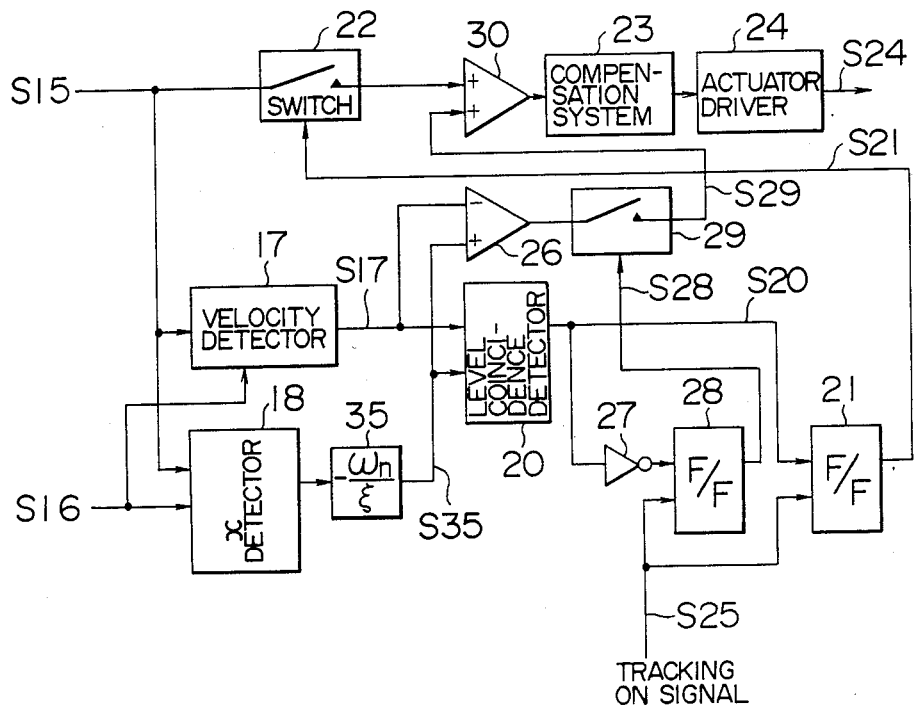
FIG. 12 shows the structure of a tracking system preferably used for the practice of a fourth embodiment of the method of the present invention.

A fourth embodiment of the present invention will be described with reference to FIGS. 12 and 13. FIG. 12 is a block diagram showing the structure of the fourth embodiment, and FIG. 13 shows signal waveforms appearing at various parts of FIG. 12.

In the aforementioned first, second and third embodiments, the tracking servo loop is closed by waiting until the condition set forth in the equation (1) or (2) is satisfied. This fourth embodiment contemplates to shorten the waiting time. This fourth embodiment is arranged so that, when the traversing velocity v of the beam spot is high, the velocity v of the beam spot is forcedly reduced, and the beam-track alignment point is then detected. More precisely, when the velocity v of the beam spot is higher than that in the equation (1), that is, when v is $$v > -\frac{\omega_n}{\xi} \cdot x, \Delta v \text{ expressed as} \qquad (23)$$

$$\Delta v = v + \frac{\omega_n}{\xi} \cdot x$$

is used as a correction factor, and the velocity v is controlled so as to reduce $\Delta v$ to $\Delta v \rightarrow 0$, thereby reducing the traversing velocity of the beam spot. Then, when the velocity v is reduced until the equation (1) is satisfied, the tracking control loop is closed according to the method described in the first to third embodiments.

The structure and operation of this fourth embodiment will now be described with reference to FIGS. 12 and 13. In this fourth embodiment which is a modification of the third embodiment, it is supposed that the tracking ON signal S25 is turned into its high level at time $t_m$ where the traversing velocity v of the beam spot is high, as shown in (f) of FIG. 13.

The output signal S17 of the velocity detector 17 is applied to the level coincidence detection circuit 20 together with the output signal S35 of the amplifier (or the attenuator) 35 and applied also to a differential amplifier 26. Up to time $t_n$, the level of the signal S17 does not coincide with that of the signal S35, and the output signal S20 of the level coincidence detection circuit 20 is in its low level. In this case, the signal S20 is passed through an inverter 27 to be applied as a high-level signal to a flip-flop 28. Therefore, when the tracking ON signal S25 is turned into its high level at time $t_m$, the flip-flop 28 is set, and its output signal S28 turns into its high level to close a switch 29 at time $t_m$, as shown in (h) of FIG. 13. On the other hand, the differential amplifier 26 generates an output signal indicative of the difference $$\Delta v \left( \Delta v = v + \frac{\omega_n}{\xi} x \right)$$

between the value v of the signal S17 and the value $$-\frac{\omega_n}{\xi} x$$

of the signal S35, and such a signal appears as an output signal S29 of the switch 29 as shown in (e) of FIG. 13 and is applied to a summing amplifier 30. At this time, the output signal S21 of the flip-flop 21 is in its low level, and the switch 22 is open. Therefore, the signal S29 shown in (e) of FIG. 13 is applied to the servo loop including the compensation system 23 and actuator driver 24, so that the velocity v of the beam spot is controlled to reduce $\Delta v$ to zero. That is, after time $t_m$, the traversing velocity v of the beam spot is quickly reduced as shown in (d) of FIG. 13 by the function of the signal S29. Then, when the value of the velocity v becomes equal to the value $$-\frac{\omega_n}{\xi} x$$

of the signal S35 at time $t_n$, the value of $\Delta v$ is reduced to zero, and the value of the signal S29 is also reduced to zero as shown in (e) of FIG. 13. At the same time, the output signal S20 of the level coincidence detection circuit 20 turns into its high level to reset the flip-flop 28 thereby opening the switch 29 and acts also to set the flip-flop 21. Therefore, the output signal S21 of the flip-flop 21 turns into its high level to close the switch 22, thereby starting the tracking control for attaining the beam-track alignment. Thus, the beam spot is quickly aligned with the center of the target track.

According to this fourth embodiment, the beam spot can be quickly aligned with the center of the target track even when the traversing velocity v of the beam spot is high. This is because the tracking control is initiated after controlling the velocity of the beam spot to reduce it to the velocity value optimum for the beam-track alignment.

The manner of tracking control after completion of the velocity control in this fourth embodiment is of the displacement preferential type as in the case of the second or third embodiment. However, the manner of tracking control may be modified to that of the velocity preferential type similar to that of the first embodiment.

The first, second, third and fourth embodiments have been principally directed to the tracking control for attaining the beam-track alignment. However, the present invention is also applicable to shortening the settling time in the case of a track jump for access to a traget track.

Figure 14:
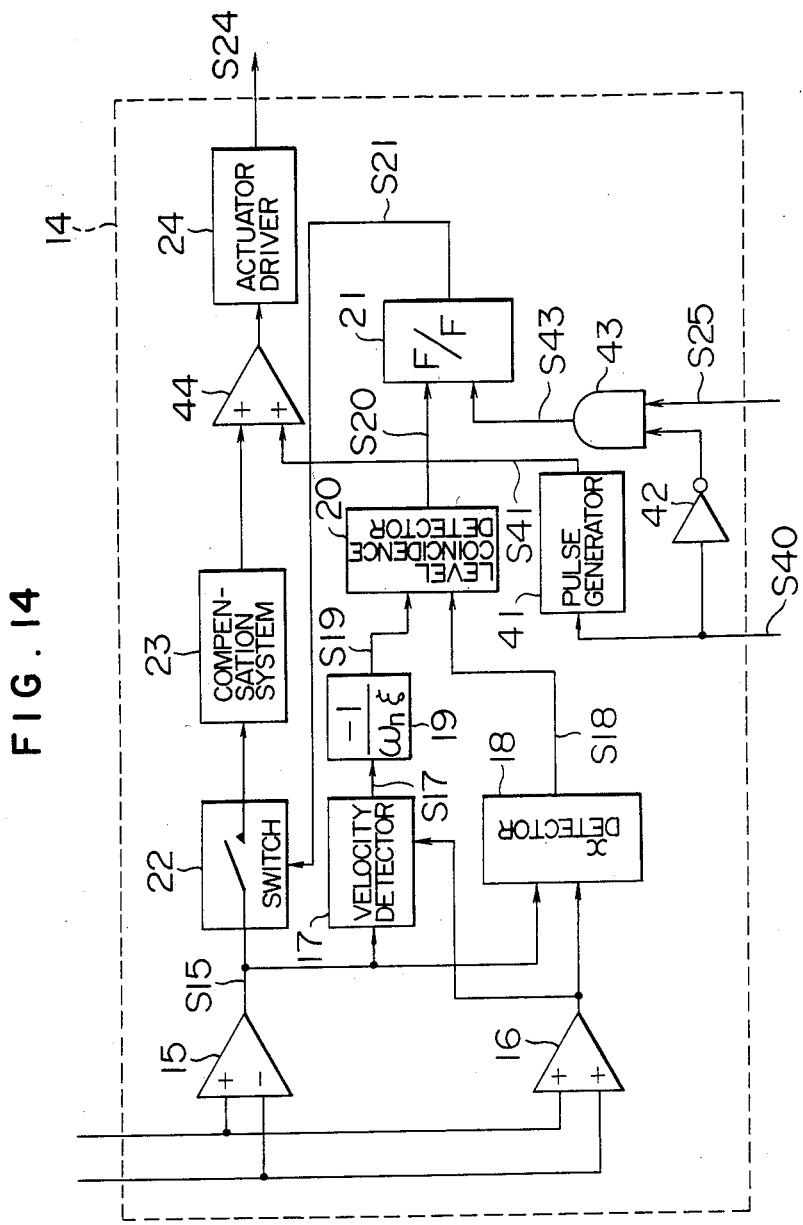
FIG. 14 shows the structure of part of a tracking system preferably used for the practice of a fifth embodiment of the method of the present invention.
Figure 15:
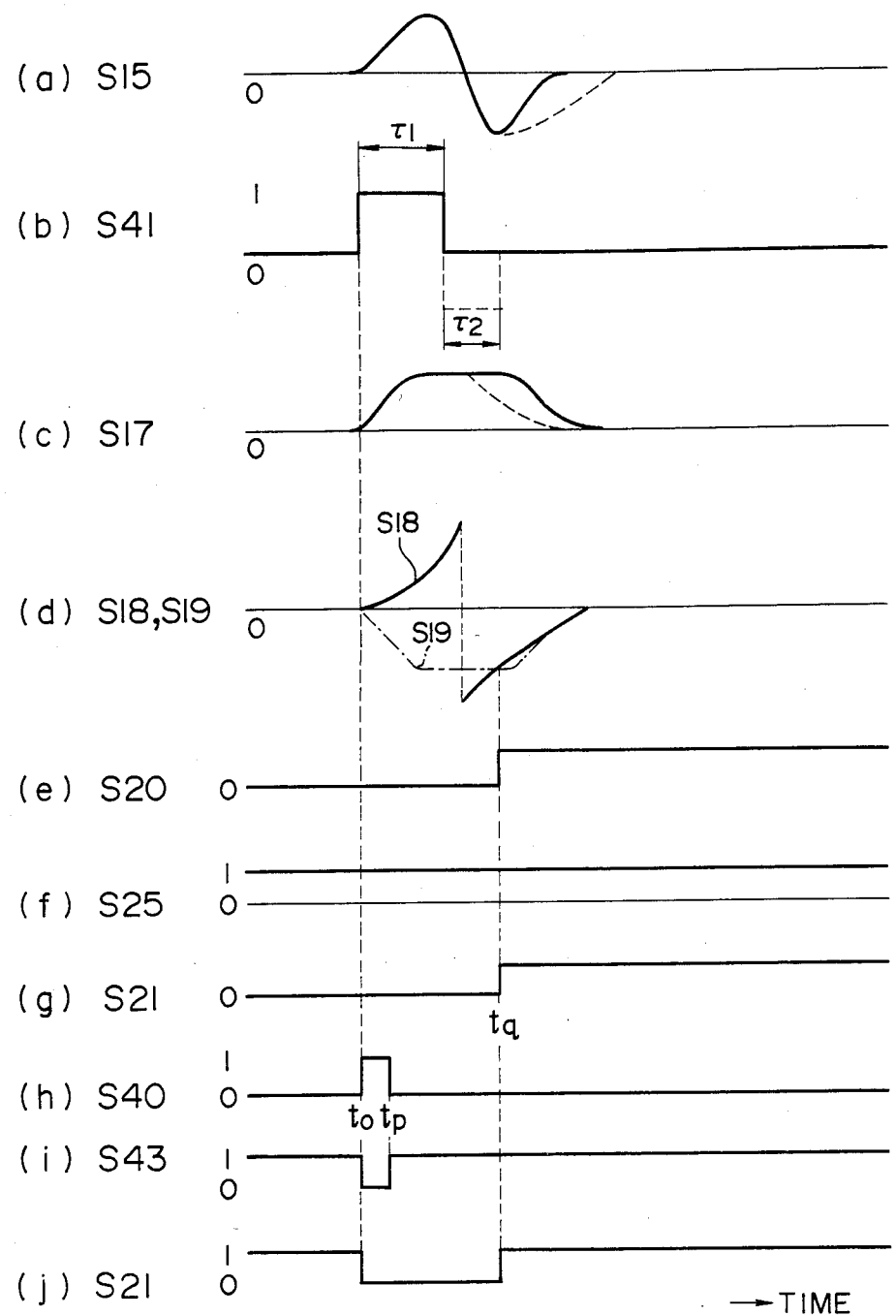
FIG. 15, consisting of (a)–(j) is a time chart showing signal waveforms appearing at various parts of the tracking system shown in FIG. 14.

FIG. 14 is a block diagram showing the structure of a fifth embodiment of the present invention when utilized for a one-track jump, and FIG. 15 shows signal waveforms appearing at various parts of FIG. 14 This fifth embodiment is actually a modification of the first embodiment shown in FIG. 2.

When a one-track jump is required, it is a common practice to open the switch 22 to open-loop the tracking control system, in the course of execution of the tracking control in which the switch 22 is kept closed, and to apply a pulse signal S41 as shown in (b) of FIG. 15 to the actuator driver 24 for forcedly causing a one-track jump of the beam spot from a track to the next adjacent track. The prior art practice includes applying an accelerating pulse S41 having a pulse width $\tau_1$ to the actuator driver 24, and applying then a decelerating pulse of opposite polarity having a pulse width $\tau_2$ as shown by the dotted lines in (b) of FIG. 15, thereby sufficiently reducing the velocity v of the beam spot. Thereafter, the switch 22 is closed to cause a one-track jump of the beam spot to the next adjacent track. The track error signal S15 and the output signal S17 of the velocity detector 17 in such a case have waveforms as shown by the broken lines in (a) and (c) respectively of FIG. 15. The prior art method including application of the decelerating pulse having the pulse width $\tau_2$ has been defective in that the delayed arrival of the beam spot at the target results in a longer period of time required for the beam-track alignment as shown by the broken line in (a) of FIG. 15.

In contrast, such a decelerating pulse is not used in this fifth embodiment. According to the fifth embodiment, after acceleration of the beam spot by application of the accelerating pulse S41, the velocity v and displacement x of the beam spot are measured as in the case of the first embodiment, and the tracking servo loop is closed at the position where the value of the displacement x satisfies the equation (2).

The structure and operation of the fifth embodiment will now be described.

While the tracking control is being performed with the switch 22 being kept closed, an accelerating pulse S40 as shown in (h) of FIG. 15 is applied at time $t_o$ from a higher-order system to a pulse generator 41 which is, for example, a one-shot multivibrator. The pulse generator 41 applies a pulse signal S41 having a predetermined pulse width $\tau_1$ as shown in (b) of FIG. 15 to a summing amplifier 44. The accelerating pulse S40 is also applied to an AND gate 43 through an inverter 42. As a result, the AND gate 43 generates an output signal S43 which is kept in its low level for a period of time $(t_o-t_p)$ which is the same as the pulse width of the accelerating pulse S40, as shown in (i) of FIG. 15. Therefore, the flip-flop 21 is reset at time $t_0$ thereby opening the switch 22 at that time, and the pulse signal S41 is applied to the actuator driver 24 to cause a one-track jump of the beam spot to the next adjacent track.

The output signal S19 of the amplifier 19 and the output signal S18 of the x detector 18 are compared in the level coincidence detection circuit 20. When level coincidence between the two signals S19 and S18 is reached at time $t_q$ as shown in (d) of FIG. 15, the output signal S20 of the level coincidence detection circuit 20 turns into its high level thereby setting the flip-flop 21. The output signal S21 of the flip-flop 21 turns into its high level to close the switch 22 at time $t_q$ thereby restarting the tracking control for attaining the beam-track alignment. At this time $t_q$, the pulse signal S41 has been turned into its low level already.

According to the above manner of track jumping, a one-track jump occurs at an optimum point for each track. Therefore, the desired track jump can be effected within a short period of time as shown by the solid lines in FIG. 15. When the accelerating pulse S41 is too strong to find a point which satisfies the equation (2), the pulse width $\tau_1$ should be shortened or the velocity of the beam spot should be reduced as described in the fourth embodiment. In such a case, a decelerating pulse may be used to correct the velocity of the beam spot.

Although the fifth embodiment is adapted for the tracking control of the velocity preferential type, it may be adapted for the tracking control of the displacement preferential type.

Where detection of the velocity of the beam spot within a short period of time is required as in the case of the tracking control for the purpose of a one-track jump, the method described above may be difficult to meet the requirement. In such a case, the velocity of the beam spot can be detected as by differentiating the output signal of the x detector.

Thus, application of the present invention to the track jump is advantageous in that period of time required for the track jump can be shortened. Therefore, the present invention is very effective for access for repeating the track jump a plurality of time.

In the aforementioned embodiments, the tracking control for attaining the beam-track alignment is carried out when the velocity v and displacement x of the beam spot detected at the starting time of the tracking servo operation satisfy the fixed conditions.

In the embodiment shown in FIG. 2, the total beam-quantity signal S16 represents the sum of the output signals of the two-parted photo detectors, and this signal S16 is used to distinguish between beam reflection from the central portion of a track and that from an inter-track area. However, any other suitable method may be employed when it can attain the purpose of distinction. For example, when information pits are provided already on the entire area of a disk such as a compact disk, an envelope component of the sum of the output signals of the two-parted photo detectors may be used as the signal S16.

It will be understood from the foregoing detailed description of the present invention that an optimum initial velocity and an optimum initial displacement of a beam spot are based for starting tracking control thereby achieving beam-track alignment. Therefore, the period of time required for achieving the beam-track alignment can be shortened. Therefore, the capability of high-speed access to tracks on an optical disk can further increase the speed of information retrieval from the optical disk.

We claim:

1. A method of beam-track alignment in an apparatus including an optical disk and a tracking servo loop for controlling a beam spot until the beam spot is aligned with a target track according to a tracking error signal which is obtained on the basis of a reflected beam from the optical disk when a beam spot traverses the target track on the optical disk comprising the steps:

detecting the velocity v of a beam spot moving in parallel to the surface of the optical disk and traversing the target track, for which beam-track alignment is desired, in a direction orthogonal with respect to the track;

detecting the displacment x given by the distance between the center of the target track and the present position of the beam spot; and closing the tracking servo loop to thereby start tracking control when the relation between the detected values of the velocity v and displacment x of the beam spot satisfies a predetermined condition based on the closed loop characteristics of the tracking servo-loop.

2. A method of beam-track alignment as claimed in claim 1, wherein said tracking control is started when the value of the velocity v in the relation between x and v is given by $$v = -\frac{\omega_n}{\xi} \cdot x_0$$

where $x_0$ is the value of the displacement x at the starting point of the beam-track alignment, and $\omega_n$ and $\xi$ are a natural frequency and a damping factor respectively of a closed tracking servo loop of the optical disk apparatus when calculated according to the dominant root of oscillation.

3. A method of beam-track alignment as claimed in claim 1, wherein said beam-track alignment is started when the value of the beam spot displacement x in the relation between x and v is given by $$x = -\frac{1}{\omega_n \xi} \cdot v_0$$

where $v_0$ is the value of the velocity v at the starting time of the beam-track alignment, and $\omega_n$ and $\xi$ are a natural frequency and a damping factor respectively of a closed tracking servo loop of the optical disk apparatus when calculated according to the dominant root of oscillation.

4. A beam-track alignment apparatus for use in an optical disk apparatus, comprising:
   photo detector means for detecting a reflected beam from an optical disk when a beam spot traverses a target track on the optical disk;
   tracking error detecting means for generating a tracking error signal on the basis of the output signal of said photo detector means;
   total beam-quantity detecting means for generating a total beam-quantity signal on the basis of the output signal of said photo detector means;
   means for detecting, on the basis of said tracking error signal and said total beam-quantity signal, the velocity v of the beam spot moving in parallel to the surface of the optical disk and traversing the target track, for which beam-track alignment is desired, in a direction orthogonal with respect to the track;
   means for detecting, on the basis of said tracking error signal and said total beam-quantity signal, the displacement x representing the distance between the present position of the beam spot and the center of the track adjacent to the beam spot in the direction to which the beam spot moves;
   means for generating a tracking control starting signal commanding to start the tracking control when the relation between the values of v and x satisfies a predetermined relation;
   a tracking servo loop controlling the beam spot until the beam spot is aligned with said traget track according to said tracking error signal; and
   switch means for controlling the opening and closing of said tracking servo loop, said switch means closing said loop in response to said tracking control starting signal.

5. A beam-track alignment apparatus as claimed in claim 4, wherein said tracking control starting signal generating means includes:
   means for multiplying the output value v of said velocity detecting means by $$\frac{-1}{\omega_n \xi},$$

where $\omega_n$ and $\xi$ are a natural frequency and a damping factor respectively of a closed tracking servo loop of the optical disk apparatus when calculated according to the dominant root of oscillation;
   means for comparing the output value x of said displacement detecting means with the output value $$-\frac{v}{\omega_n \xi}$$

of said multiplying means and generating a coincidence signal when coincidence is reached therebetween; and
   means for generating said tracking control starting signal when said coincidence signal is applied thereto simultaneously with a tracking ON signal applied externally to command the tracking.

6. A beam-track alignment apparatus as claimed in claim 4, wherein said displacement detecting means generates a beam-track alignment point signal when the displacement x attains a predetermined value $x_0$ corresponding to a beam-track alignment point, and wherein said tracking control starting signal generating means includes
   means for comparing the output value v of said velocity detecting means with a predetermined value $$-\frac{\omega_n}{\xi} \cdot x_0,$$

where $\omega_n$ and $\xi$ are a natural frequency and a damping factor respectively of a closed tracking servo loop of the optical disk apparatus when calculated according to the dominant root of oscillation and generating a coincidence signal when coincidence is reached therebetween, and
   means for generating said tracking control starting signal when said coincidence signal and said beam-track alignment point signal are applied thereto simultaneously with a tracking ON signal applied externally to command the tracking.

7. A beam-track alignment apparatus as claimed in claim 6, wherein said predetermined value $X_0$ is $$\pm \frac{q}{4} \text{ or } \pm \frac{q}{2},$$

where q is the track pitch of the optical disk.

8. A beam-track alignment apparatus as claimed in claim 4, wherein said tracking control starting signal generating means includes:
   first comparing means for comparing the output value x of said displacement detecting means with a predetermined displacement value $x_0$ and generating a first coincidence signal when coincidence is reached therebetween;
   means for multiplying said predetermined value $$x_0 \text{ by } -\frac{\omega_n}{\xi}$$

and generating the resultant value $$-\frac{\omega_n}{\xi} \cdot x_0,$$

where $\omega_n$ and $\xi$ are a natural frequency and a damping factor respectively of a closed tracking servo loop of the optical disk apparatus when calculated according to the dominant root of oscillation;

second comparing means for comparing said output value $$-\frac{\omega_n}{\xi} \cdot x_0$$

with the output value v of said velocity detecting means and generating a second coincidence signal when coincidence is reached therebetween;

means for permitting application of said signal $$-\frac{\omega_n}{\xi} \cdot x_0$$

to said second comparing means only when said first coincidence signal is applied thereto; and means for generating said tracking control starting signal when said second coincidence signal is applied thereto simultaneously with a tracking ON signal applied externally to command the tracking.

9. A beam-track alignment apparatus as claimed in claim 4, wherein said tracking control starting signal generating means includes:

means for multiplying the output value x of said displacement detecting means by $$-\frac{\omega_n}{\xi}$$

and generating the resultant value $$-\frac{\omega_n}{\xi} \cdot x,$$

where $\omega_n$ and $\xi$ are a natural frequency and a damping factor respectively of a closed tracking servo loop of the optical disk apparatus when calculated according to the dominant root of oscillation;

means for comparing the output value v of said velocity detecting means with said output value $$-\frac{\omega_n}{\xi} \cdot x$$

and generating a non-coincidence signal when coincidence is not reached therebetween but generating a coincidence signal when coincidence is reached therebetween;

means for computing the difference between the output value v of said velocity detecting means and said value $$-\frac{\omega_n}{\xi} \cdot x$$

and generating a difference signal indicative of the difference therebetween;

means for applying said difference signal to said closed tracking servo loop when said non-coincidence signal is applied thereto simultaneously with a tracking ON signal applied externally to command the tracking; and means for applying said tracking control starting signal to said switch means when said tracking ON signal and said coincidence signal are applied simultaneously thereto.

10. A beam-track alignment apparatus as claimed in claim 4, wherein said tracking control starting signal generating means includes:

means for multiplying the output value v of said velocity detecting means by $$-\frac{1}{\omega_n \xi}$$

and generating the resultant value $$-\frac{v}{\omega_n \xi},$$

wherein $\omega_n$ and $\xi$ are a natural frequency and a damping factor respectively of a closed tracking servo loop of the optical disk apparatus when calculated according to the dominant root of oscillation;

comparing means for comparing the output value x of said displacement detecting means with said output value $$-\frac{v}{\omega_n \xi}$$

and generating a coincidence signal when coincidence is reached therebetween;

means for applying a pulse signal having a predetermined pulse width to said closed tracking servo loop in response to a jump signal applied externally to command jumping of the beam spot by one track pitch;

means for applying said tracking control starting signal to said switch means when said coincidence signal is applied thereto simultaneously with a tracking ON signal applied externally to command the tracking; and means responsive to said jump signal for preventing application of said tracking ON signal to said tracking control starting signal generating means.

* * * * *